Jan. 26, 1954  N. McK. HOLME-SHAW  2,667,378
GLARE SHIELD AND CLIP THEREFOR
Filed Sept. 11, 1948
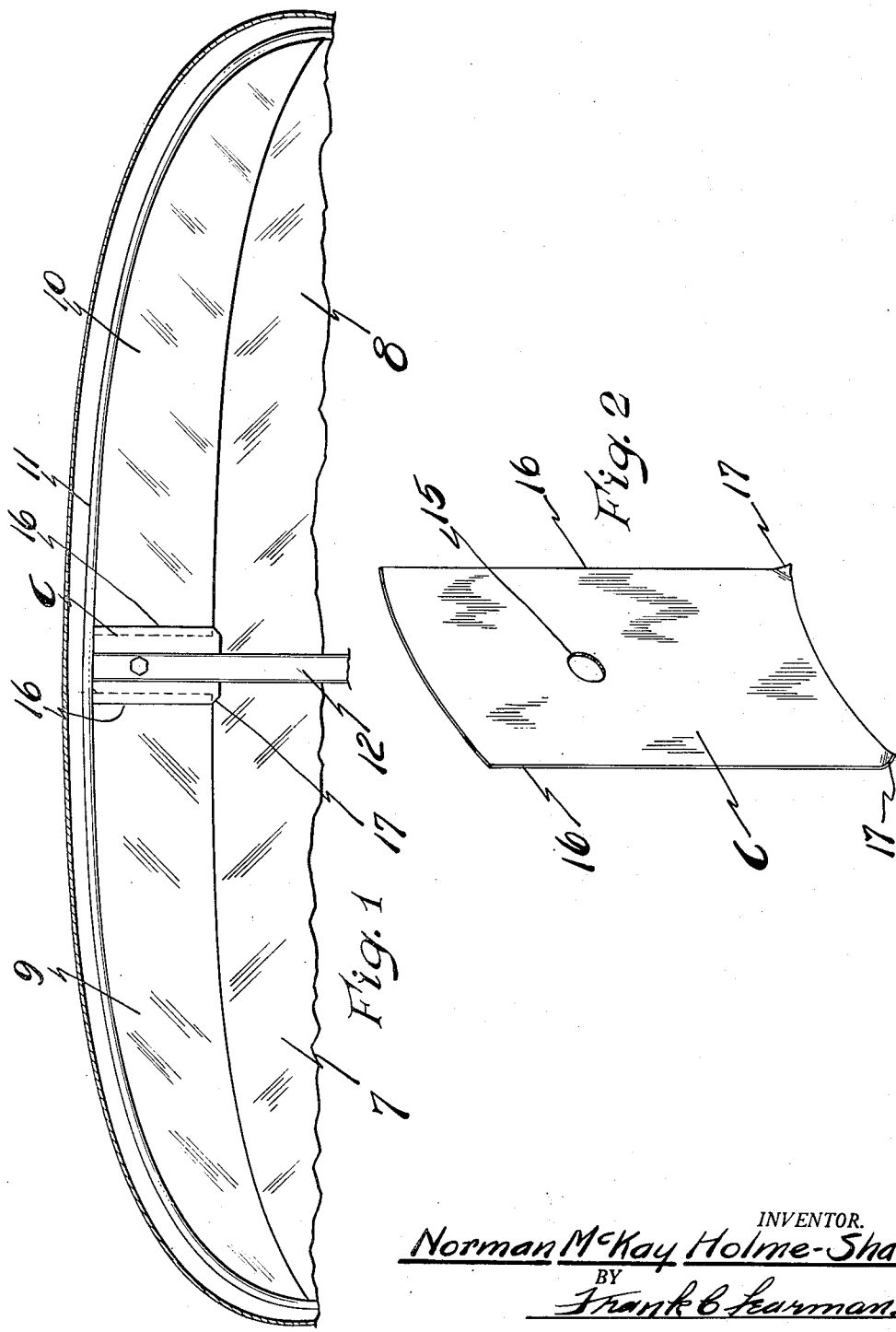
INVENTOR.
Norman McKay Holme-Shaw
BY
Frank C Fearman
ATTORNEY Patented Jan. 26, 1954

2,667,378

UNITED STATES PATENT OFFICE 2,667,378

GLARE SHIELD AND CLIP THEREFOR

Norman McKay Holme-Shaw, Saginaw, Mich., assignor to Visilite Corporation, Saginaw, Mich.

Application September 11, 1948, Serial No. 48,877

2 Claims. (Cl. 296—97)

This invention relates to glare shields which are made up of optically true sheets of plastic material cut to predetermined shape to fit the contour of the windshield opening for eliminating sun glare through the portion of the automobile windshield covered thereby and to installation clips therefor.

In the practical application of shields of this nature, I find that when the shields are tightly secured at the ends and top, certain irregularities, such as bulging etc. may occur, and this is primarily due to the differences in the expansion and contraction of the windshield glass and the plastic sheets.

One of the prime objects of the invention is to provide a resilient glare shield clip for yieldably securing one end of a glare shield sheet of the type described in position.

Another object of the invention is to provide simple, practical and economical means whereby the adjacent end sections of the glare shield strips can be yieldingly secured in position by comparatively inexperienced help and in a minimum length of time.

A further object is to provide a very simple, resilient metallic clip that overlies the ends of the glare shield strips, and by means of which the strips may be held against displacement and in true relation and alignment.

A further object still is to provide an installation clip which is economical to manufacture, very easy to apply, and which very materially simplifies the installation of the glare shield to the windshield of an automobile.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a transverse, front-elevational, sectional, view of an automobile looking toward the windshield, and showing the glare shield installed, with my installation clip in position thereon.

Fig. 2 is a perspective view of the clip.

The instant invention relates to the means and method of installing a glare shield such as shown and described in my application for Letters Patent of the United States of America, entitled "Glare Shields," filed February 11, 1948, Serial No. 7,540.

A great many automobiles have a divided windshield, a center post forming the dividing member and dividing it into individual panels 7 and 8, to which optically true plastic sheets 9 and 10 may be applied in intimate, facial contact. The generally rectangular sheets have upper edges formed to the contour of the upper edge of the windshield as shown which are received beneath a sealing strip 11.

The sealing strip 11 surrounds the edge of the windshield, and mold trim 12 is provided on the face of the center post as usual. When installing the glare shields, the securing screws are first backed out, after which the plastic shields 9 and 10 are placed in intimate, facial contact with the glass. Then by placing the fingers of the hand on the sheet and manipulating it to produce a slight rubbing action and simultaneously exerting upward pressure, the upper edge of the shield can be worked in under the sealing strip 11, with the inner end of each strip spaced a distance of approximately one-eighth inch from the center post.

The next step is to mount the installation clip "C" in position on the upper end section of the center or division post 6. This clip is formed of very thin, resilient, metallic stock, and is transversely bowed as shown, so that the side edges thereof overlie the adjacent ends of the glare shields.

An opening 15 is provided in the clip "C" in alignment with the opening in the trim 12, and when the clip is mounted in position, the screws 14 are screwed tight, so that the edges 16 of the clip yieldingly bear on the glare shield and hold it tight against the windshield.

When the mold and trim are tightly secured, a screw driver (not shown) or similar tool is used to turn the lower corners of the clip as shown at 17, these corners bearing against the windshield, so that there can be no downward slippage of the glare shield sheets.

From the foregoing description, it will be apparent that I have perfected a very simple, practical, and inexpensive mounting clip for glare shields of the type described.

What I claim is:

1. The combination with a pair of generally rectangular, flexible glare shields having optically true surfaces adapted to be arranged in intimate facial contact with the upper edge of a windshield panel having a dividing center post, each shield being shaped to fit the contour of the upper and side edges of the windshield panel and receivable beneath the windshield frame in clamping engagement with the windshield panel, each sheet being of a size to extend across the windshield panel from one side edge to a point adjacent said center post and extending downwardly from the upper edge of the windshield to a point slightly above the line of sight of the driver, the faces of the plastic flexible sheets and windshield being flat and true to form mutually adhering surfaces when rubber, of a crowned, flexible, sheet member insertable between the windshield center post garnish trim and said center post with the side edges bearing on the inner ends of said glare shields, said metallic sheet member being provided with an opening on its center line adapted to correspond in position to one of the fastener receiving openings in the center post.

2. The combination with a pair of generally rectangular, flexible glare shields having optically true surfaces adapted to be arranged in intimate facial contact with the upper edge of a windshield panel having a dividing center post, each shield being shaped to fit the contour of the upper and side edges of the windshield panel and receivable beneath the winshield frame in clamping engagement with the windshield panel, each sheet being of a size to extend across the windshield panel from one side edge to a point adjacent said center post and extending downwardly from the upper edge of the windshield to a point slightly above the line of sight of the driver, the faces of the plastic flexible sheets and windshield being flat and true to form mutually adhering surfaces when rubbed, of a flexible, transversely bowed sheet member insertable between the windshield center post garnish trim and said center post with the side edges bearing on the inner ends of said glare shields, the lower corners of said clip being bent inwardly on a diagonal bend line substantially at right angles to the main body of said clip to bear against the glare shield and provide a stop for the lower edge of each glare shield on the opposite sides of the center post, said metallic sheet member being provided with an opening on its center line adapted to correspond in position to one of the fastener receiving openings in the center post.

NORMAN McKAY HOLME-SHAW.

References Cited in the file of this patent

UNITED STATES PATENTS

| Number | Name | Date |
|---|---|---|
| 1,105,590 | Abbott | July 28, 1914 |
| 1,462,305 | Snyder | July 17, 1923 |
| 1,793,127 | Osius | Feb. 17, 1931 |
| 1,863,897 | Cloppert | June 21, 1932 |
| 1,884,155 | Oestnaes et al | Oct. 25, 1932 |
| 1,899,715 | Olson | Feb. 28, 1933 |
| 1,928,469 | Tinnerman | Sept. 26, 1933 |
| 2,149,209 | Dickie | Feb. 28, 1939 |
| 2,215,331 | Marsh | Sept. 17, 1940 |
| 2,263,815 | Northrup | Nov. 25, 1941 |
| 2,264,014 | Wohlfield | Nov. 25, 1941 |
| 2,318,143 | Cutting | May 4, 1943 |
| 2,442,632 | Zachman | June 1, 1948 |